Inventor
W. W. Griffiths
by
Attorney

Patented Feb. 19, 1929.

1,703,064

UNITED STATES PATENT OFFICE.

WALTER W. GRIFFITHS, OF WAUWATOSA, WISCONSIN, ASSIGNOR TO ALLIS-CHALMERS MANUFACTURING COMPANY, OF MILWAUKEE, WISCONSIN, A CORPORATION OF DELAWARE.

POWER INSTALLATION.

Application filed September 21, 1922. Serial No. 589,507.

The present invention relates in general to power installations, and it has particular relation to the provision of apparatus for facilitating the production and utilization of power from a plurality of sources in an economical manner.

It frequently happens that it is economically desirable to supply a load from a plurality of independent sources of power, the power output of at least one of which sources is variable, to the end that a variable load may be supplied with the required energy from the two sources in common. A power system of this general type is particularly applicable to conditions where power from one source is available at relatively low cost but in a more or less limited amount which, in itself, is not capable of economically supplying the entire load demands. In this case, it becomes especially desirable to utilize the maximum amount of power available from the source which produces power at the lower cost, before drawing upon a second source of power which produces power at a relatively higher cost. Where the prime movers are arranged to drive generators, it is especially desirable that the latter should always operate at the same speed, even under conditions of variable load, so that the generator current may be always of the same frequency; for otherwise, parallel operation with other generators would be impossible.

The present invention may include as an embodiment thereof, a common load, such as an electrical generator, driven by a prime mover operable at either constant or variable speed and power, and a second prime mover, both of the prime movers being arranged to drive the common load, along with means for insuring that the generator operates at a definite and desired speed or frequency, to the final end that independently of the power available or absorbed from the first prime mover, the generator may be supplied with the required power to cause it to furnish current of the required frequency. The invention may likewise include the use in the system, of an ordinary type of generator, or a generator of the double rotation type, both the field and armature of the generator being driven by separate prime movers.

The invention has particular utility in connection with a power system involving a plurality of power sources one of which may be a hydraulic turbine and the other a steam engine or turbine or an oil or gas engine, or generally any prime mover wherein the amount of power produced is directly proportional to the amount of fuel or motive fluid consumed, and hence the cost of producing power from this latter source is directly dependent upon the expenditure for fuel. A system of this character may be automatically controlled to insure that a maximum or other predetermined amount of power is produced by the hydraulic turbine and any excess of power required, is supplied by the auxiliary source of power, and in any case, this latter power source is always capable of such regulation as to insure its supplying power up to its maximum for driving the common load.

An object of the present invention is to provide a power installation of improved design embodying a plurality of power sources and controlling means therefor for automatically insuring that one source may be operated at a certain speed or to produce a certain amount of power and a second source may produce any excess power required, to the end that a common load may be driven with an operating characteristic thereof maintained constant or controlled in a desired manner.

Another object of this invention is to provide a power installation of improved design embodying a plurality of sources of power, and controlling means therefor for automatically insuring that one source is regulated so as to produce any required power supplementary to that produced by the first source, so as to enable a common load to be driven at a constant speed in spite of variations in said load or the power available at said first source.

A further object of this invention is to provide a power installation of improved design embodying a plurality of sources of power arranged to drive an electrical load, one of said power sources being adapted to supply a portion of the total load, a second source of power of variable speed adapted to supply the remainder of the total load, along with automatic control devices operative to vary the speed and power of the secondary source for the purpose of maintaining constant a characteristic of the electrical energy of said load.

These and other objects and advantages are attained by this invention, various novel features of which will appear from the description and drawings herein, disclosing an embodiment of the invention, and will be more particularly pointed out in the claims.

Figure 1:
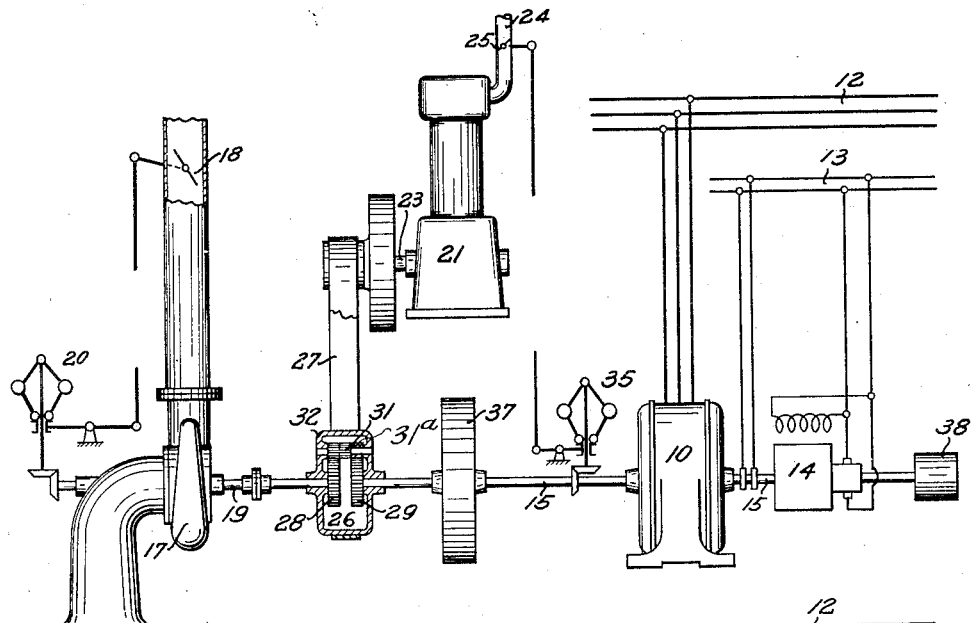
Fig. 1 represents a power system, in generally diagrammatic form, embodying features of the present invention.

In accordance with the disclosure of Fig. 1, a synchronous, alternating current generator 10 has its armature connected to supply a distribution circuit 12, and its rotating field member supplied from a direct current supply line 13 or, as indicated, from a direct current generator 14 mounted on the shaft 15 of the generator 10.

A hydraulic turbine 17 having its inlet controlled by guide vanes or other inlet controlling devices 18, drives a shaft 19. This turbine may be provided with any usual form of speed governor, indicated at 20, which may be effective to control the speed of the turbine for loads thereon below a predetermined maximum which usually corresponds to a condition of the inlet gates being fully open or nearly so.

An auxiliary source of power in the form of an oil or gas engine, or a steam engine or turbine, indicated at 21, is operative to drive a shaft 23, the inlet 24 of this auxiliary power source, which may be considered as a gas, oil or steam engine, being controlled by a throttle valve 25. The hydraulic turbine 17 and the engine 21 are connected in driving relation to the shaft 15 of the generator, through a differential 26 which may or may not, as desired, include a speed-changing device, the engine being connected through a gear or belt drive 27 to the casing 32 of the differential. The turbine shaft 19 is connected to a gear 28, and a gear 29 is mounted upon the shaft 15 of the generator 10. One or more sets of gears 31, 31ª are mounted in the casing 32 of the differential and are operatively associated with each other and with the gears 28 and 29, so that the shaft 15 is driven at a speed which is a resultant of the speeds of the turbine 17 and the engine 21. As will be apparent, the ratio between the gears 28, 29 and 31, 31ª may be 1 to 1, or any other value desired.

Assuming a load on the generator 10 greater than the maximum which can be supplied by the hydraulic turbine 17 with its inlet gates full-open, or open to the point corresponding to maximum efficiency or most economical power production, the turbine, through its shaft 19 and the differential 26, tends to drive the generator 10 at a speed corresponding to the gear ratio of the differential. The engine 21 supplies power through the drive 27 and the differential to the shaft 15 of the generator, the resultant speed of the shaft 15 being such as produces the desired constant speed and frequency of the generator.

The engine 21 is controlled by a frequency or speed responsive governor of any suitable type, indicated at 35, acting upon the throttle 25 of the engine to cause the speed and power of the latter to be such as results in the desired constant speed of the generator 10 independently of variations in load upon the latter.

A fly wheel 37 is preferably provided upon the shaft of the generator to absorb minor load fluctuations and to insure more or less appreciable time element in the variations in the speed of the latter, thus permitting a more gradual control of the engine 21 upon the occurrence of considerable variations in the load on the generator 10.

The shaft 15 of the generator may be provided with a pulley 38 or other device which will permit use of this shaft as a source of power for other power-consuming devices.

During operation of the system, it will be apparent that with the inlet gates of the turbine 17 in full-open position, the turbine furnishes its full power through the differential to the generator shaft and the engine furnishes power in a variable amount dependent upon the load upon the generator 10, the power supplied by the engine and the speed of the latter, if necessary, being automatically regulated by the governor 35, to the end that the speed and frequency of the generator is maintained constant independently of load variations thereon.

Figure 2:
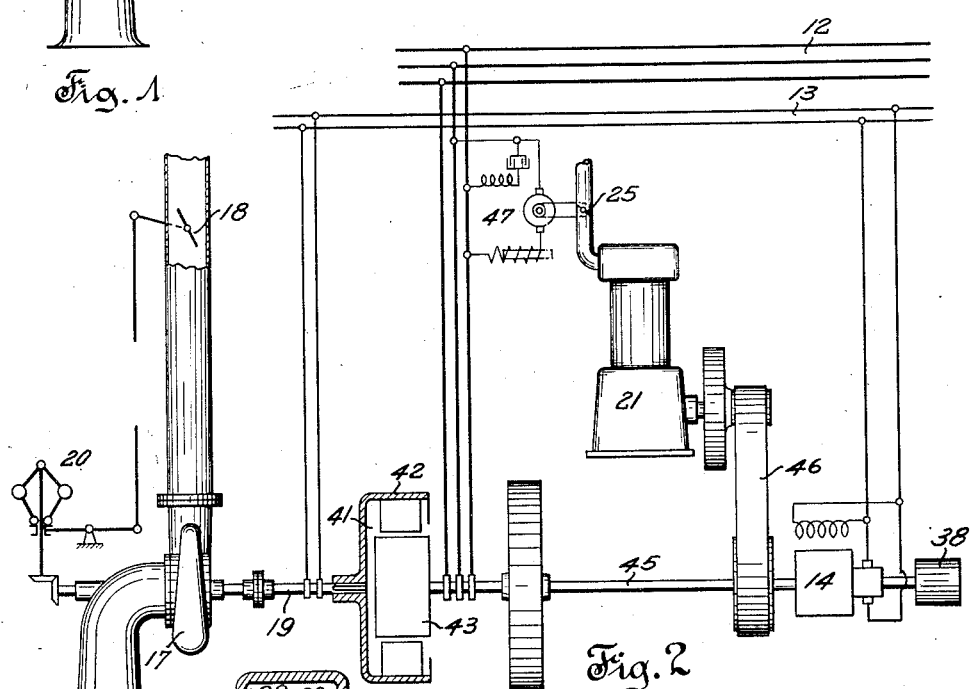
Fig. 2 is a similar showing of a modified embodiment of the invention.
Figure 3:
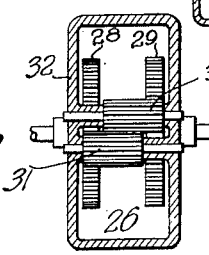
Fig. 3 is an enlarged sectional plan view of a detail of the apparatus shown in Fig. 1.

In accordance with the disclosure of the modified system of Fig. 2, the generator 41 is of the double-rotation type, and includes an outer field member 42 supplied from the direct current line 13 and an inner rotating armature 43 connected to supply the distribution line 12. One of the rotating elements, here shown as the element 42, is connected in driving relation to the shaft 19 of the hydraulic turbine 17, and the shaft 45 of the armature 43 is connected in driven relation, through the drive 46, to the engine 21. The throttle 25 of the engine 21 is automatically controlled, preferably through a frequency responsive device 47, to cause the engine to operate at such speed as will insure constant frequency of the current supplied by the generator to the distribution circuit 12.

Assuming this system in operation with the turbine furnishing a predetermined maximum of power and driving the rotating field at a speed which is dependent upon this maximum power of the turbine, the engine 21 has its inlet controlled by the frequency responsive device 47 so as to cause the engine to drive the rotating armature 43 at such speed as to produce the desired resultant speed and frequency of the generator.

When the total load on the generator is above that corresponding to full load on the hydraulic turbine, it is preferable that the inlet gates of the latter should be positively held in the corresponding open position to prevent the two prime movers from sharing the total load equally or proportionally.

It will be apparent that with either of the systems disclosed, more particularly the system of Fig. 1, in case the total load on the generator 10 is less than the predetermined maximum of the hydraulic turbine 17, the latter may be automatically controlled through its governor 20 to drive the generator alone at the required constant speed, the engine 21 at this time being substantially ineffective for the purpose of furnishing power to the generator.

A distinct advantage of causing the turbine and engine to drive parts of the mechanical differential 26 of Fig. 1 and the generator 41 of Fig. 2, constituting an electrical differential, in opposite directions is that a higher resultant effective speed of the generator may be attained, and hence the required generator output may be secured with a generator of smaller size.

While an ordinary use or embodiment of the invention is described herein in connection with a main unit or source of power in the form of a hydraulic turbine and a second or auxiliary source of power in the form of an engine, it will be obvious that features of the invention are applicable to the control of the production of power from a plurality of sources, independently of the character of the particular sources, any one or more of which may be a hydraulic or steam turbine, or an oil, gas or steam engine.

It should be understood that it is not desired that the invention claimed be limited to the exact details of construction shown and described, for obvious modifications will appear to a person skilled in the art.

It is claimed and desired to secure by Letters Patent:

1. A power installation, comprising a prime mover operable to utilize all of the energy available at its inlet, a second prime mover, an energy absorbing device, and means operative to connect said energy absorbing device in driven relation to both of said prime movers and to insure operation of said energy absorbing device at substantially constant speed independently of the particular speed of operation of either of said prime movers.

2. A power installation, comprising a plurality of prime movers one of which is operable at a variable speed, an alternating current generator, and means operative to connect said generator in driven relation to both of said prime movers and to insure operation of said generator to produce energy of substantially constant frequency in spite of variations in the relation between the operating speeds of said prime movers.

3. A power installation, comprising a plurality of power sources one of which is operable at a variable speed, an alternating current generator, means for connecting said generator in driven and differential speed relation to both of said power sources in common, and automatically operative means for insuring the operation of said generator to produce energy of substantially constant frequency in spite of variations in the relation between the operating speeds of said power sources.

4. A power installation, comprising a power source, a second power source, means for controlling the speed and power of said second power source, a synchronous electric generator, means for connecting said generator in driven and differential speed relation to both of said power sources in common, and automatically operative means for regulating said controlling means to insure the operation of said generator to produce energy of substantially constant frequency in spite of variations in the load on said generator and the relation between the operating speeds of said power sources.

5. A power installation, comprising a plurality of prime movers, a load shaft, means for mechanically connecting said prime movers in differential speed relation to said shaft to drive the latter, and means automatically operative to insure the operation of said shaft at a constant speed in spite of variations in the relation between the power supplied by the several prime movers.

6. A power installation, comprising a prime mover operable to utilize all of the energy available at its inlet, a second prime mover, means for controlling the power output of said second prime mover, a common load connected in driven and differential speed relation to both of said prime movers in common, and means for regulating said controlling means to insure the operation of said load at a constant speed in spite of variations in the relation between the operating speeds of said prime movers.

7. A power installation, comprising a prime mover operable to utilize all of the energy available at its inlet, a second prime mover, an energy absorbing device, and means operative to connect said energy absorbing device in driven relation to both of said prime movers and to insure operation of said energy absorbing device at substantially constant speed independently of the particular speed of operation of either of said prime movers, said means comprising instrumentalities operative when the power delivered by one of said prime movers to said energy absorbing device is above a definite substantial value for controlling the power delivered by the second prime mover to said energy absorbing device.

8. A power installation, comprising a power source operable to utilize the energy available at its inlet up to the full load capacity of said power source, an energy absorbing device including an electric generator connectible in driven relation to said power source, a second power source connectible in driving relation to said generator, and means responsive to the occurrence of a load above a predetermined value on said first power source for causing said second power source to supply to said electrical generator the variable power requirements thereof above said predetermined value to insure operation of said electrical generator at a predetermined speed.

9. A power installation, comprising a power source operable to utilize the energy available at its inlet up to the full load capacity of said power source, an energy absorbing device including an electrical generating unit connectible in driven relation to said power source, a distribution circuit connected to said generating unit, a second power source mechanically connected in driving relation to said generator unit, the amount of energy available at the inlet of each of said power sources being independent of the energy being converted by the other power source and means responsive to the occurrence of a load above a predetermined value on said first power source for causing said second power source to supply to said electrical generating unit the variable power requirements thereof above said predetermined value to insure operation of said electrical generating unit at a predetermined speed, said means comprising instrumentalities automatically operative to vary the supply of motive fluid to said second power source.

10. A power installation, comprising a hydraulic turbine, an alternating current generator connectible in driven relation to said turbine, an auxiliary source of mechanical power mechanically connectible in driving relation to said generator, and means responsive to the occurrence of a definite load on said turbine for causing said auxiliary power source to supply to said generator through its mechanical connection therewith the variable power requirements thereof to insure its operation at a substantially constant frequency.

11. A power installation, comprising a distribution circuit, a hydraulic turbine, an auxiliary source of mechanical power, an alternating current generating unit connected in power-supplying relation to said distribution circuit and mechanically connectible in driven relation to said turbine and said auxiliary power source, and means responsive to the occurrence of a definite load on said turbine for causing said auxiliary power source to supply to said generating unit through its mechanical connection therewith the variable power requirements thereof above said definite load value to insure operation of said unit to produce electrical energy at a substantially constant frequency.

In testimony whereof, the signature of the inventor is affixed hereto.

WALTER W. GRIFFITHS.